United States Patent [19]
Kondou et al.

[11] Patent Number: 5,280,471
[45] Date of Patent: Jan. 18, 1994

[54] ARRANGEMENT AND METHOD FOR DETECTING INTERFERENCE IN TDMA COMMUNICATIONS SYSTEM

[75] Inventors: Seiji Kondou; Hiroshi Akahori, both of Tokyo, Japan

[73] Assignee: NEC Corporation, Tokyo, Japan

[21] Appl. No.: 811,290

[22] Filed: Dec. 20, 1991

[30] Foreign Application Priority Data

Dec. 21, 1990 [JP] Japan .................. 2-413452

[51] Int. Cl.$^5$ .............................................. H04J 3/14
[52] U.S. Cl. .................... 370/17; 370/95.3; 455/67.3; 455/226.2; 455/226.3
[58] Field of Search ............... 370/95.3, 77; 375/99; 455/50.1, 51.1, 67.3, 226.2, 296, 226.3

[56] References Cited

U.S. PATENT DOCUMENTS 5,148,548 9/1992 Meche et al. .................. 455/67.3 X Primary Examiner—Douglas W. Olms
Assistant Examiner—Russell Blum
Attorney, Agent, or Firm—Sughrue, Mion, Zinn, Macpeak & Seas

[57] ABSTRACT

Interference in a high speed receive signal is effectively detected in a TDMA communications system wherein a plurality of time slots is provided within a TDMA frame. A comparator is arranged to receive a first signal indicative of receive signal strength and a reference level signal. The comparator compares the magnitudes of the two signals applied thereto and outputs a comparison result signal. A delay circuit is supplied with a second signal indicative of a time slot which is not in use and which delays the second signal by a predetermined time using a clock which is synchronized with the time slots of the TDMA frame. A gate circuit, preceded by the comparator and the delay circuit, is supplied with the outputs of the comparator and the delay circuit. The gate circuit outputs a third signal which changes a logic level in the event that the strength of the first signal exceeds that of the reference level signal during the time slot which is not in use.

6 Claims, 3 Drawing Sheets

ARRANGEMENT AND METHOD FOR DETECTING INTERFERENCE IN TDMA COMMUNICATIONS SYSTEM

BACKGROUND OF THE INVENTION

1. Field of the Invention

The present invention relates to an arrangement and method for detecting an interference in a receive signal in a TDMA (Time Division Multiple Access) communications system.

2. Description of the Prior Art

TDMA techniques, in addition to the current extensive use thereof in satellite communication arrangements, have recently assumed an important role in mobile communications systems.

While the present invention will be discussed in connection with a TDMA mobile communication system, it will be understood that it may also be applied to a TDMA satellite communications system without departing from the concept underlying the instant invention.

In a TDMA mobile communications system, plural mobile units located within a given service area are respectively allowed to communicate with a land site using allocated time slots of each consecutive TDMA frame. The time slot used by a given mobile unit has therefore the same period as the TDMA frame.

In the event that a land site detects a predetermined number of interferences in a receive signal(s) within a given time duration, it is necessary to change the data carrier frequency currently in use to another one to avoid communication degradation.

Before turning to the present invention it is deemed preferable to discuss a known arrangement for detecting the presence of interferences in a receive signal(s) in a TDMA mobile communications system.

FIG. 1 is a block diagram schematically showing a land site 6 which includes a known interference detecting arrangement. The portions of the land site 6, which are deemed irrelevant to the instant invention, are not shown for the sake of brevity.

In FIG. 1, a plurality of mobile units Ma-Mn are located within a service area which is covered by the land site 6. A receiver 10 which forms part of the land site 6 is supplied, via an antenna 12 and a duplexer 14, with a burst signal(s) transmitted from one or more of the mobile units Ma-Mn. The receiver 10 demodulates the incoming burst signal and subsequently outputs a corresponding base band signal S8. A transceiver control section 8 includes a transceiver controller 16, a sampling circuit 18 and a microcomputer 20. The base band signal S8 is applied to the transceiver controller 16 via a line L8. A transmitter 22 is interconnected between the transceiver controller 16 and the duplexer 14 as shown.

The sampling circuit 18 receives a signal S10 from the receiver 10. The signal S10 is generated at an IF (Intermediate Frequency) stage (not shown) of the receiver 10 and indicates electric field strength of each of the signals in the time slots of the TDMA frame. The sampling circuit 18 samples the signal S10 in synchronism with a clock CLK applied thereto from the transceiver controller 16. The clock CLK comprises a train of pulses each of which is generated in synchronism with time slots of a TDMA frame. The sampling circuit 18 applies, via a line L14, the output thereof (viz., sampled data) S12 to the microcomputer 20. The microcomputer 20 includes a ROM (not shown) for storing a program dedicated to detecting the interference in the receive signals.

In more specific terms, the land site controller (not shown) informs, via a line L16, the transceiver controller 16 of the overall use of the time slots of a TDMA frame. This information which indicates the current use of the time slots is also applied to the transmitter 22 as a signal S14 over the line L11. The transmitter 22 receives a base band signal from the transceiver controller 16 via the line L10 and implements time slot data transmission using the signal S14.

The microcomputer 20 receives the output signal S12 via the line L14 and also receives the information indicating the current use of the time slots via a line L12. This information applied to the microcomputer 20 via the line L12 corresponds to the signal S14. Following this, the microcomputer 20 checks to see, using the program stored in the ROM therewithin, whether or not the output signal S12 is detected within the time slot not in use. If this happens, interference in the data communication channel currently used is indicated. The microcomputer 20 advises the transceiver controller 16 of the presence of interference. Further, the land site controller is advised of the detection of interference from the transceiver controller 16, and changes the communication channel to another one if necessary. The manner in which the current carrier frequency is changed to a new one is not directly concerned with the present invention, and hence will not be discussed in detail for the sake of brevity.

With the recent trend in high speed data transmission in a TDMA communications system, the above-mentioned prior art has encountered the problem in that the detection of the interference is extremely difficult or nearly impossible through the use of software. The reason for this is that the speed with which the interference detection routines can be executed are limited and are often unable to follow the high speed incoming data.

SUMMARY OF THE INVENTION

It is an object of the present invention to provide a hardware arrangement by which interferences in high speed TDMA data transmission can be detected with a simple configuration.

Another object of the present invention is to provide a method by which interferences in high speed TDMA data transmission can be detected without the use of a software.

In brief, the above objects are achieved by an arrangement and method wherein interference in a high speed receive signal is effectively detected in a TDMA communications system wherein a plurality of time slots is provided within a TDMA frame. A comparator is arranged to receive a first signal indicative of receive signal strength and a reference level signal. The comparator compares the magnitudes of the two signals applied thereto and outputs a comparison result signal. A delay circuit is supplied with a second signal indicative of a time slot which is not in use and which delays the second signal by a predetermined time using a clock which is synchronized with the time slots of the TDMA frame. A gate circuit, preceded by the comparator and the delay circuit, is supplied with the outputs of the comparator and the delay circuit. The gate circuit outputs a third signal which changes a logic level in the event that the strength of the first signal exceeds that of the reference level signal during the time slot which is not in use.

More specifically, a first aspect of the present invention comes in an arrangement wherein an arrangement for detecting an interference in a receive signal in a time division multiple access (TDMA) communications system wherein a plurality of time slots is provided within a TDMA frame, comprising: first means arranged to receive a first signal indicative of receive signal strength and a reference level signal, the first means comparing the first signal and the reference level signal and outputting a comparison result signal; second means which is supplied with a second signal indicative of a time slot which is not in use and which delays the second signal by a predetermined time using a clock which is synchronized with the time slots of the TDMA frame; and third means which is responsive to the outputs of the first and second means and which outputs a third signal, the third signal changing a logic level in the event that the comparison result signal exists within the time slot which is not in use.

A second aspect of the present invention comes in a method for detecting an interference in a receive signal in a time division multiple access (TDMA) communications system wherein a plurality of time slots is provided within a TDMA frame, comprising the steps of: (a) receiving a first signal indicative of receive signal strength and a reference level signal, and comparing the first signal and the reference level signal and outputting a comparison result signal; (b) receiving a second signal indicative of a time slot which is not in use and which delays the second signal by a predetermined time using a clock which is synchronized with the time slots of the TDMA frame; and (c) responding to the outputs of the first and second means and outputting a third signal, the third signal changing a logic level in the event that the comparison result signal exists within the time slot which is not in use.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 2:
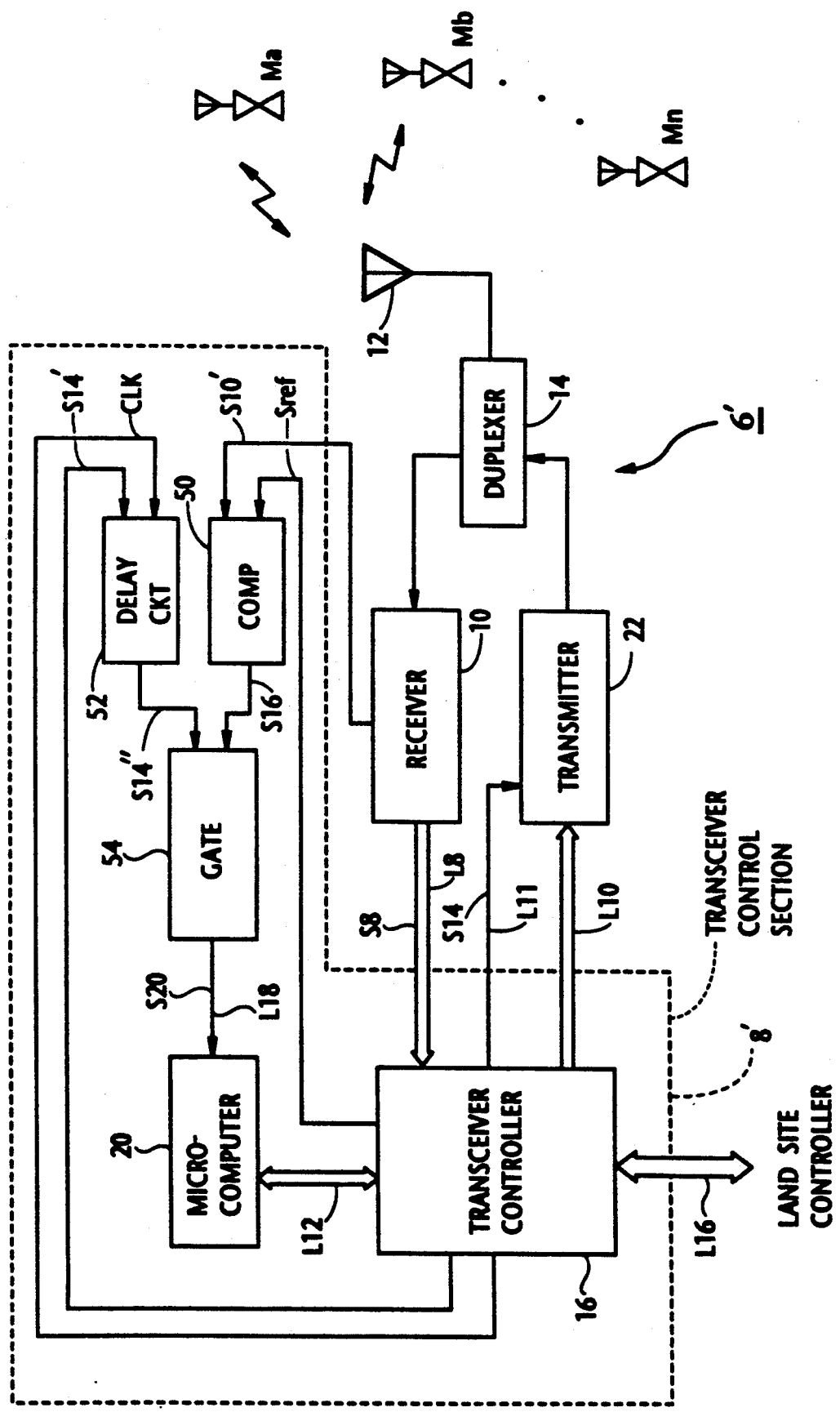
FIG. 2 is a block diagram showing an embodiment of the present invention.

Reference is now made to FIG. 2, wherein an embodiment of the present invention is schematically illustrated in block diagram form.

Figure 1:
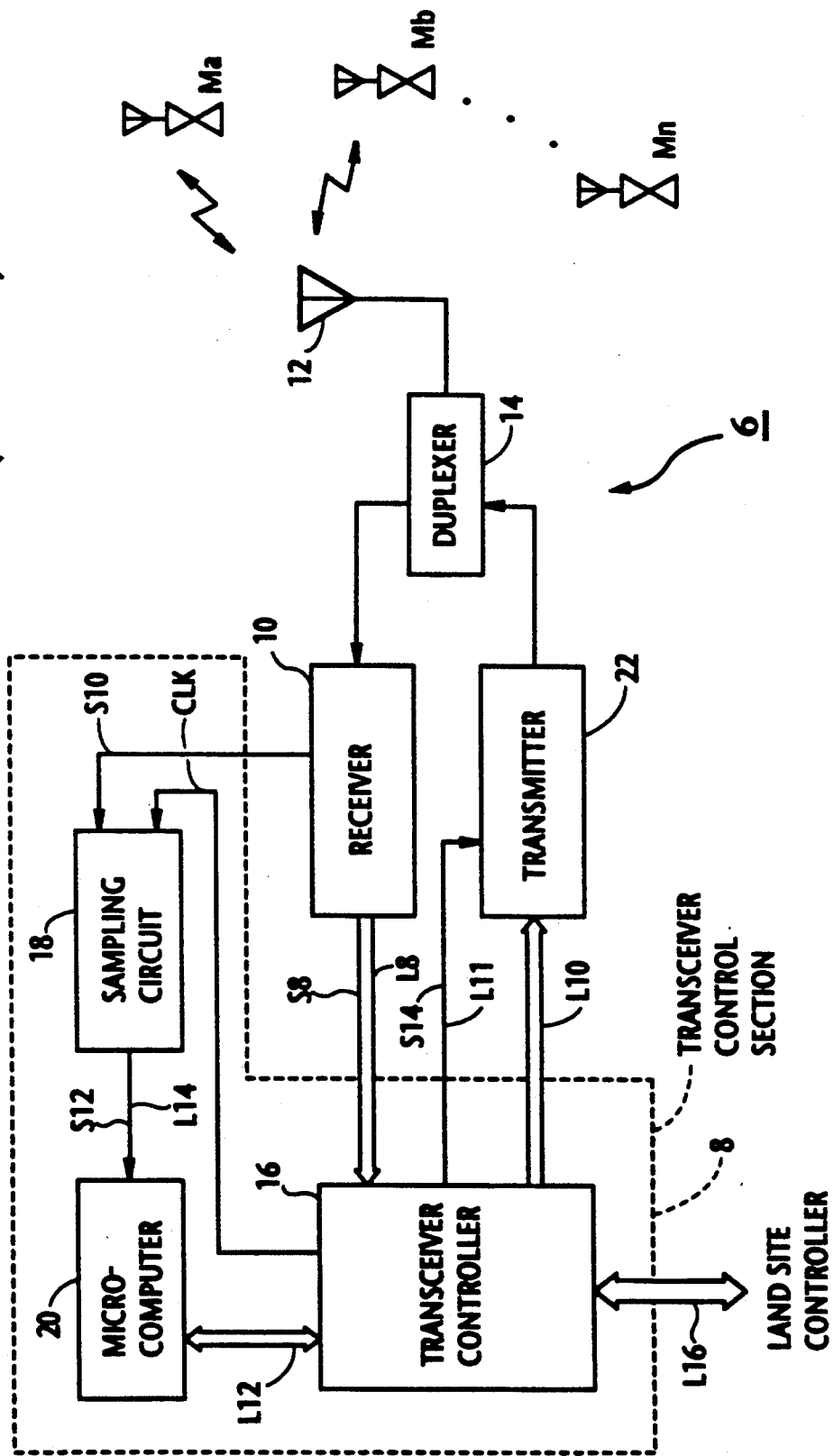
FIG. 1 is a block diagram showing a known arrangement discussed in the opening paragraphs of the instant disclosure.

The arrangement of FIG. 2 differs from that of FIG. 1 in that the former arrangement includes a transceiver control section 8' which is configured in a different manner as compared with the counterpart 8 of FIG. 1. Viz., the section 8' includes a comparator 50, a delay circuit 52 and a gate circuit 54 in lieu of the sampling circuit 18 of FIG. 1. The remaining portions of the FIG. 2 arrangement has been described in the opening paragraphs of the instant disclosure with reference to FIG. 1 and as such, further descriptions thereof will be omitted to avoid redundancy.

The comparator 50 is supplied with a reference signal Sref and a signal S10'. The reference signal Sref is controllable in terms of the magnitude thereof, while the signal S10' indicates an electric field strength of each of receive signals transmitted over a given carrier frequency. Therefore, the signal S10' corresponds to the signal S10 in FIG. 1. The comparator 50 compares the signals S10' and Sref, and supplies the gate circuit 54 with an output signal S16 indicating the comparison result. On the other hand, the delay circuit 52 receives a clock CLK and a signal S14' both applied thereto from the transceiver controller 16, and delays the signal S14' by a predetermined time using the clock CLK and subsequently outputs a delay signal S14" which is applied to the gate circuit 54. The clock CLK will be described late in detail. Following this, the gate circuit 54 issues a signal S20 which indicates the presence of interference in the receive signals as will be understood as the description proceeds. The signal S14' corresponds to the signal S14 applied from the transceiver controller 16 to the transmitter 22 although different notations are given.

The operations of the FIG. 2 arrangement will be described with reference to FIGS. 3-5.

Figure 3:
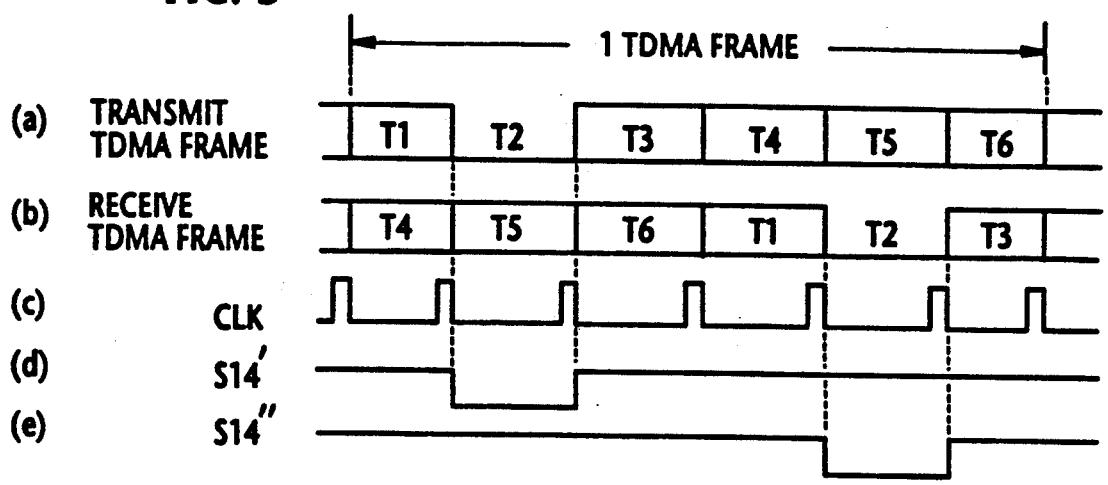
FIGS. 3-5 are timing charts depicting the operation of the present invention.

FIG. 3 illustrates timing charts (a)-(e) of: a TDMA frame transmitted from a land site 6', a receive TDMA frame, the clock CLK, the signal S14' applied to the delay circuit 52, and the output of the delay circuit 52 (viz., S14") in this order. The transmit TDMA frame as shown includes six time slots T1-T6 in this particular case.

It is assumed that the overall system including the land site 6' and the mobile units Ma-Mn are controlled such that the TDMA frame arrived at the land site 6' is delayed by three time slots as compared with the TDMA frame transmitted from the land site 6'. Although not shown in FIG. 3, a guard time interval is provided between adjacent time slots in order to absorb the receive time differences of the signals transmitted from the mobile units Ma-Mn located in different positions within the service area covered by the land site 6' (FIG. 2).

As shown in the timing chart (c) of FIG. 3, the clock CLK includes a train of pulses each of which has a trailing edge synchronized with the termination of each time slot. The clock CLK is generated in the transceiver controller 16. The signal S14' includes information whether each of the six time slots is used for communication or not. It is assumed in this embodiment that only the time slot T2 is not used for communication and therefore the signal S14' assumes a low level (timing chart (d)) during the time slot T2. Accordingly, no signal should be received in the received time slot T2 under normal operating conditions. In other words, if any signal (inclusive of noise) is detected in the received time slot T2, there is a high possibility that the arriving signals received in the other time slots may be contaminated.

In order to detect the interference in the received time slot T2, the delay circuit 52 retards the time slot usage information signal S14' by three time slots using the clock CLK applied thereto. The timing chart of the output of the delay circuit 52 (viz., S14") is shown in the item (e) of FIG. 3.

Figure 4:
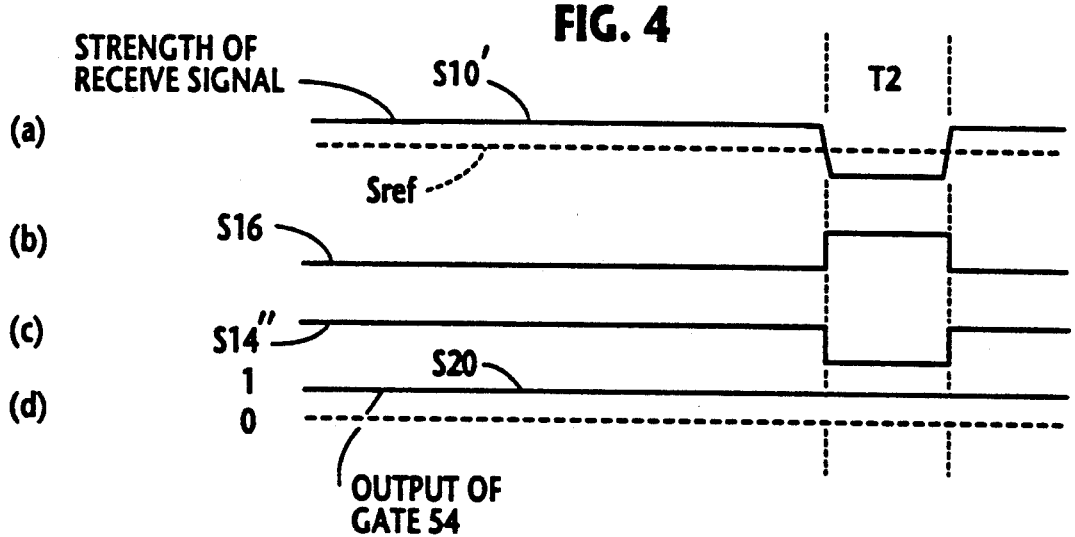
Figure 5:
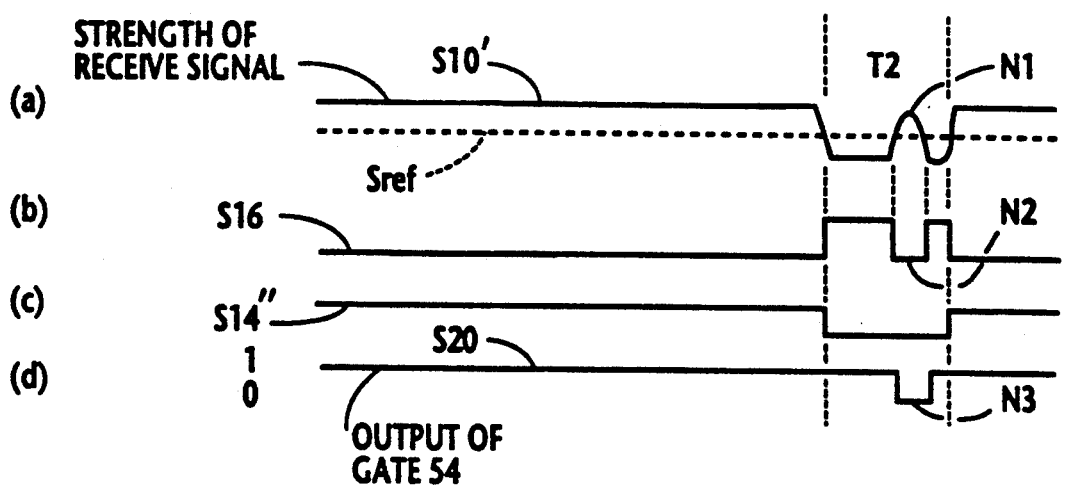

The operations of the FIG. 2 embodiment will further be discussed with FIGS. 4 and 5 each of which shows four timing charts (a)-(d).

The comparator 50 is supplied with the signal S10' and the reference signal Sref whose level is adjustable and previously set to an appropriate one prior to operation. In the event that the data signals received by the land site 6' are not subject to interference during transmission, the signal S10' is free from noise within the time slot T2 as shown in a timing chart (a) of FIG. 4. The comparator 50 is arranged such that the output thereof (viz., S16) assumes a high level when the reference signal Sref exceeds the signal S10'.

In this instance, the comparator 50 issues the signal S16 which assumes a high level only during the time slot T2 as shown in the timing chart (b) of FIG. 4. The timing chart of the output S14" of the delay circuit 52 is shown in the item (c) of FIG. 4. The gate 54 takes the form of an exclusive OR gate in this embodiment and is supplied with the signals S16, S14" after they are inverted. Thus, the gate 54 issues the output S20 which assumes a high level "1" over the entire TDMA frame in this particular instance as shown in the timing chart (d) of FIG. 4.

On the other hand, in the event that a noise N1 appears within the time slot T2 as shown in the timing chart (a) of FIG. 5, the signal S16 falls to a low level in the time slot T2 as indicated by N2. Thus, the output S20 of the gate 54 assumes a low level "0" as denoted by N3 within the time slot T2. Consequently, the microcomputer 20 receives the output S20 and detects the presence of the interference in the receive signals.

If the number of the interferences thus detected exceeds a predetermined value within a preset time period, the microcomputer 20 requests the land site controller (not shown in FIG. 2), via the transceiver controller 16, to change the carrier frequency currently in use to another one. This operation is not directly concerned with the present invention, and hence further descriptions thereof will be omitted.

Although not referred to in the above, in addition to the aforesaid channel for the TDMA frames, a control channel may be provided for controlling calling requests, TDMA frame timings, etc. As an alternative, control bursts may be inserted at the leading portion of each of the time slots T1-T6 for the same purposes.

While the foregoing description describes one embodiment according to the present invention, the various alternatives and modifications possible without departing from the scope of the present invention, which is limited only by the appended claims, will be apparent to those skilled in the art.

What is claimed is:

1. An arrangement for detecting an interference in a receive signal in a time division multiple access (TDMA) communications system wherein a plurality of time slots is provided within a TDMA frame, comprising:

first means arranged to receive a first signal indicative of receive signal strength and a reference level signal, the first means comparing the first signal and the reference level signal and outputting a comparison result signal;

second means which is supplied with a second signal indicative of a time slot which is not in use and which delays the second signal by a predetermined time using a clock which is synchronized with the time slots of the TDMA frame; and third means which is responsive to the outputs of the first and second means and which outputs a third signal, the third signal changing a logic level in the event that the comparison result signal exists within the time slot which is not in use, wherein said predetermined time corresponds to a time duration by which a TDMA frame received is delayed as compared with a TDMA frame transmitted.

2. An arrangement for detecting an interference in a receive signal in a time division multiple access (TDMA) communications system wherein a plurality of time slots is provided within a TDMA frame, comprising:

first means arranged to receive a first signal indicative of receive signal strength and a reference level signal, the first means comparing the first signal and the reference level signal and outputting a comparison result signal;

second means which is supplied with a second signal indicative of a time slot which is not in use and which delays the second signal by a predetermined time using a clock which is synchronized with the time slots of the TDMA frame; and third means which is responsive to the outputs of the first and second means and which outputs a third signal, the third signal changing a logic level in the event that the comparison result signal exists within the time slot which is not in use, wherein said third means is a logic gate.

3. An arrangement as claimed in claim 2, wherein the logic gate is an exclusive OR gate.

4. A method for detecting an interference in a receive signal in a time division multiple access (TDMA) communications system wherein a plurality of time slots is provided within a TDMA frame, comprising the steps of:

(a) receiving a first signal indicative of receive signal strength and a reference level signal, and comparing the first signal and the reference level signal and outputting a comparison result signal;

(b) receiving a second signal indicative of a time slot which is not in use and delaying the second signal by a predetermined time using a clock which is synchronized with the time slots of the TDMA frame; and (c) responding to the outputs of the first and second means and outputting a third signal, the third signal changing a logic level in the event that the comparison result signal exists within the time slot which is not in use, wherein said predetermined time corresponds to a time duration by which the TDMA frame received is delayed as compared with the TDMA frame transmitted.

5. A method for detecting an interference in a receive signal in a time division multiple access (TDMA) communications system wherein a plurality of time slots is provided within a TDMA frame, comprising the steps of:

(a) receiving a first signal indicative of receive signal strength and a reference level signal, and comparing the first signal and the reference level signal and outputting a comparison result signal;

(b) receiving a second signal indicative of a time slot which is not in use and delaying the second signal by a predetermined time using a clock which is synchronized with the time slots of the TDMA frame; and (c) responding to the outputs of the first and second means and outputting a third signal by a logic gate, the third signal changing a logic level in the event that the comparison result signal exists within the time slot which is not in use.

6. A method for detecting an interference in a receive signal in a time division multiple access (TDMA) communications system wherein a plurality of time slots is provided within a TDMA frame as in claim 5, wherein said responding step includes outputting said third signal by using an exclusive OR gate.

* * * * *